March 31, 1964     A. MONTI     3,126,589
REFRIGERATOR GASKET AND THE LIKE
Filed July 12, 1960
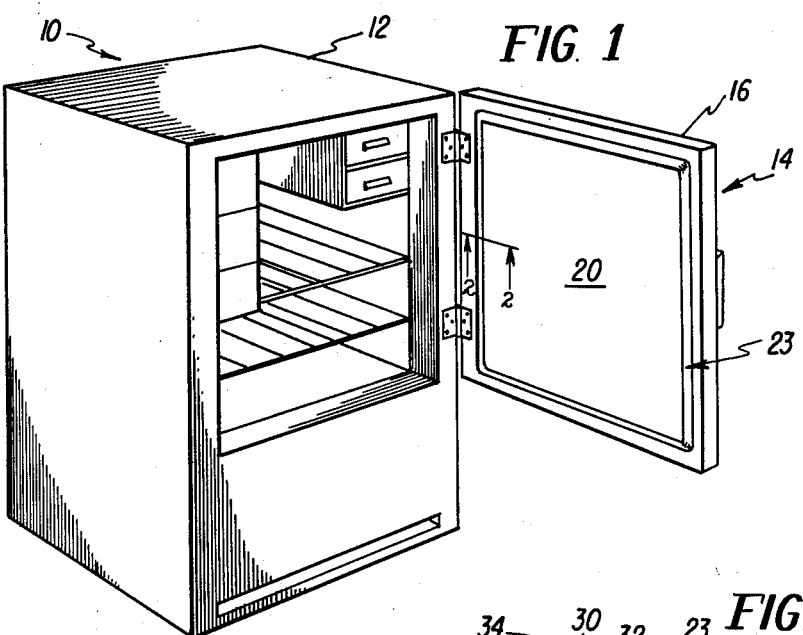
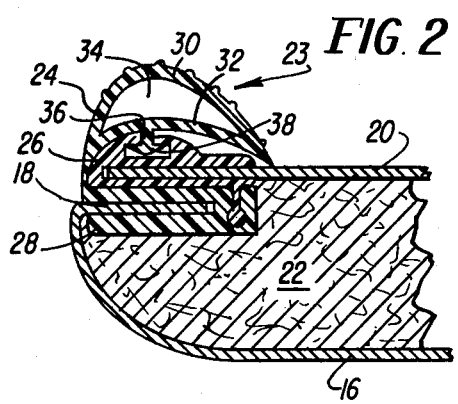
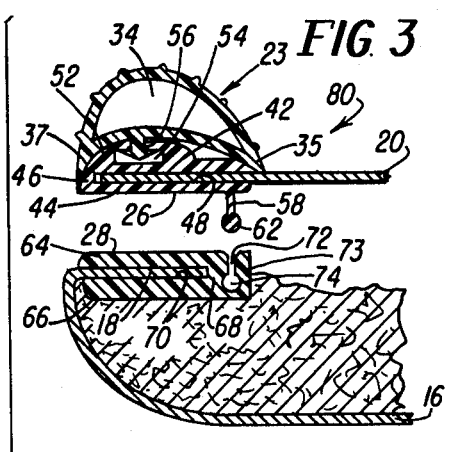
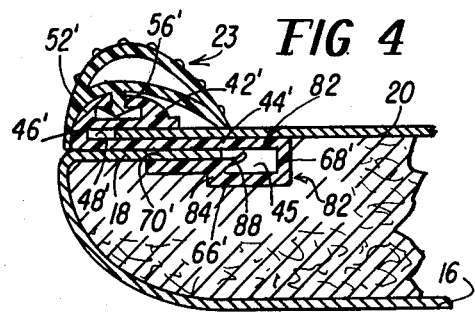
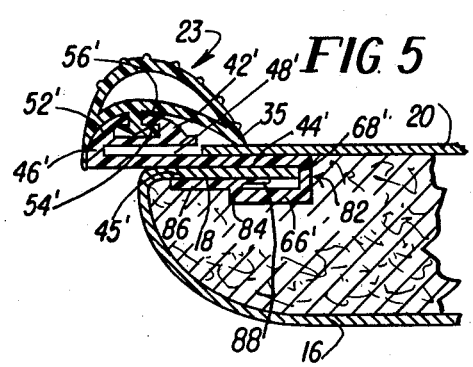
INVENTOR.
Angelo Monti
BY
*Silverman, Mullin & Cass.*
Attys.

United States Patent Office 3,126,589
Patented Mar. 31, 1964

3,126,589
REFRIGERATOR GASKET AND THE LIKE
Angelo Monti, Chicago, Ill., assignor to
Jarrow Products, Inc., Chicago, Ill.
Filed July 12, 1960, Ser. No. 42,422
14 Claims. (Cl. 20—69)

This invention relates generally to gaskets and more particularly concerns a novel gasket structure including a retainer therefor and particularly adapted for use on the closure member of refrigerators, freezers, ice-boxes and like articles.

Gaskets heretofore provided for effecting proper seals between the closure member and the body portion of refrigerators and like articles have comprised generally extruded, necessarily flexible lengths of rubber-like materials formed into various types of tubing configurations. Such gasket structures are usually secured to the closure member either by adhesive applied thereto or through channel means integral with said gasket and adapted to receive the pan element of the closure member therein, whereupon the pan with the gasket secured at its periphery is placed in position on the remaining portion of the door.

Certain requirements concerning the compressibility of said gasket elements have become mandatory both to insure proper sealing, to adapt for the relatively low closure pressures found in recently developed magnetic door articles and to comply with many newly enacted legal requirements as to safety and accessibility for said articles. These requirements include sealing and maintenance of said seal at low pressures, and the prevention of compression and the minimization of "compression set" characteristics whereby the resilience of the gasket when the door is closed will tend to prematurely break the seal between the door and the body portion of the refrigerator. Thus most gasket structures include a hollow portion which is called an air cushion, and shape and size thereof depending upon the type of door, the weight thereof and the sealing pressure desired. Also, such gasket structures were necessarily formed entirely of flexible materials of such composition to provide the proper and required compression.

Although the general sealing performance of gaskets of the aforementioned type has been satisfactory, certain substantial difficulties are encountered in the installation and maintenance thereof both during and subsequent to manufacture of the regrigerator. Since the compressibility requirements necessitated the use of rather flexible material, no substantial strength would be expected from the channel portion thereof for efficient use as securing means or retaining means therefor upon the door of the refrigerator. Therefore, additional securing means must be employed and generally, screws, studs, rivets or even adhesive were necessarily utilized. Understandably, substantial costs were incurred during the assembly of the door and gasket structure which were traceable directly to the additional operations required therein.

The added cost and inconvenience perhaps could be tolerated, however, materials of the character necessarily used have certain inherent "aging" characteristics which tend to make them less flexible, frangible and thus require frequent replacement thereof. With the means provided on prior structures, such repair, removal and replacement was tedious, difficult and costly. Moreover, the use of screws and the like necessitated the drilling of holes through a portion of said gasket structure, and thus tended to reduce their efficiency and their useful life.

Accordingly, it is the principal object of this invention to provide a gasket structure and retainer therefor which substantially eliminates the disadvantages hereinabove enumerated while providing proper sealing means for the closures of refrigerators and the like, which is simple and efficiently installed, repaired and/or replaced during and after the assembly of said articles.

Another object of the invention is the provision of a gasket structure comprising both rigid and flexible portions, the rigid portion adapted to be self secured to the door member of the refrigerator or the like, and the flexible portion carrying the sealing cushion thereon being adapted to be self secured to said rigid portion. Doors of refrigerators and the like include a pan element which usually supports many kinds of shelf and compartments for storing of commodities therein whereby the door becomes a utilitarian storage part of the refrigerator rather than merely a closure and sealing member. As a result, the increased use of the pan element in this manner caused undue pressure and wear upon the older types of gasket retaining means, said wear resulting in deterioration, bearing and disengagement of said retainer from the door. The structure contemplated by the invention is capable of withstanding such stress while still providing the necessarily flexible sealing means for the door.

A further and highly important object of the invention herein is the provision within the gasket structure of means for retaining not only the gasket, but also the pan element, to the refrigerator door without the use of screws, or other securing means. The most distinctive advantage in this respect lies in the ease of assembly of the refrigerator door, pan and gasket structures. Such ease of assembly results in increased economy, minimization of waste, facile replacement if required and generally greater quality of manufacture than heretofore possible.

A further object of the invention is the provision of an assembly for a refrigerator door gasket comprising a compressible flexible gasket strip and a gasket mount member of rigid extruded plastic material which not only serves as mounting means for said gasket but as mounting means to secure the pan of said door to the shell thereof, said rigid member also serving as a conduction barrier for said refrigerator thereby improving the sealing capabilities thereof.

Still another object of the invention is the provision, in a mount of the character described above, of means whereby same serves as a universal mounting for a gasket of any of a variety of configurations, sizes or shapes.

Other objects and advantages of this invention will become apparent as the description of preferred embodiments thereof proceed. Although reference is made frequently to the use of the invention in connection with refrigerators, the invention is obviously not limited to such articles and same may be used in a variety of articles, as will be evident to the skilled artisan.

In the drawings:

FIG. 1 is a perspective view of a typical refrigerator structure having a gasket assemblage embodying the features of the invention shown operatively intalled thereon;

FIG. 2 is a sectional view taken along line 2—2 of FIG. 1 and in the direction shown;

FIG. 3 is a partially exploded view of the section shown in FIG. 2 illustrating the manner of assembly and installation thereof;

FIG. 4 is a sectional view similar to that of FIG. 2, but illustrating a second embodiment of the invention;

FIG. 5 is a view of the section shown in FIG. 4 illustrating the manner of assembly and installation thereof.

Generally, the gasket structure embodying the invention will be described in connection with a refrigerator although the invention is not limited thereto. In FIG. 1 there is shown a typical refrigerator 10 comprising generally a body 12 and a door 14 hingedly mounted thereon. The refrigerator door 14 has an outer shell portion 16 which is provided with a reverse-bent lip 18. Over the inside of the door 14 there is generally provided a pan 20 of sheet metal or the like which serves as a retainer for the insulation 22 carried within the shell portion 16. The pan 20 may also serve as a support for a plurality of shelves, compartments, and other accessories utilized to store various commodities (not shown).

The gasket structure embodying the invention is generally designated by reference numeral 23 and is disposed on the door 14 adjacent the periphery of the inbent portion 18 of the shell 16. Said gasket structure comprises a flexible gasket portion 24, a first rigid portion 26 and a second rigid portion 28. The gasket portion 24 is in the form of an extruded length of flexible soft rubber-like material having compression characteristics dependent on the type of latch used for the refrigerator, the weight of the door, etc., all of which are determined by known methods and form no part of this invention. The particular configuration of the gasket 24 herein shown comprises a pair of arcuate walls 30 and 32 having tapering common side edges. The gasket portion 24 is extruded so that wall 30 is provided with a greater radius of curvature than wall 32, thereby resulting in a hollow center 34 forming what is generally known as cushion. Wall 32 is provided with a depending flange 36 on its under surface located between the common side edges of said walls. Flange 36 is further provided with an enlarged formation 38, which, in the embodiment shown illustrated herein is in the configuration of a barbed arrow head. Both the flange 36 and the arrowhead formation 38 extend the length of the gasket 23.

The first rigid portion 26 shall be hereinafter designated as a gasket retainer and is formed as an elongate extruded length of rigid material, preferably of vinyl or other plastic composition. Said gasket retainer 26 comprises top and bottom walls 42 and 44 respectively, said walls being joined to one another by a connecting part 46 which is integral theerwith, thereby forming a passageway 48 along the entire length thereof. The distance between walls 42 and 44 is chosen so that the periphery of the pan 20 may be slidably received within said passageway 48.

Wall 42 has a thickened portion 52 adjacent the part 46. Said thickened portion 52 is provided with an undercut channel 54 therein parallel to elongate edge thereof, and said channel 54 opening to the passageway 48 by a constricted entrance way 56 so that the enlarged portion 38 of flange 36 of the flexible gasket formation must be forced through the top opening 56 into channel 54 and thereafter will be held therein tightly. This latter operation may be accomplished by the use of a roller or like tool and is relatively simply performed because of the flexibility of said gasket portion 24.

The wall 44 is provided with an integral depending flange 58 adjacent the opening of the passageway 48. This flange 58 also extends the entire length of the rigid member 26. The bottom edge of said flange 58 is provided with an enlarged bulbous portion 62 adapted to cooperate with means provided in the second rigid member 28 and to be hereinafter described.

The second rigid member 28 will be hereinafter referred to as the pan retainer and, like said member 26, is an elongate extrusion of rigid material, preferably vinyl or other plastic composition. Said pan retainer 28 comprises a pair of flat parallel plates or walls 64 and 66 spaced one from the other joined at 68 by an integral connecting part thereby forming a passageway 70 therein for accommodation of the flange 18 of the shell 16.

The passageway 70 has its opening at the left as viewed in the figures, opposite that of passageway 48. An elongate slot 72 is formed in the wall 68 adjacent the inner edge of said pan retainer 28, said slot 72 terminating at its bottom in an enlarged portion 74. The slot 72 and portion 74 conform in configuration to the shape and dimensions of flange 58 and bulbous portion 62 of the gasket retainer 26 whereby to provide cooperative retaining means for the flange 58, the same adapted to be snapped into the slot 72 and locked therein by the cooperating enlarged portions of the respective flange and slot.

The plastic or resinous material from which the retainer members 26 and 28 are extruded is categorized herein as rigid, but it is of course to be understood that this is a relative term. Clearly the material is not resilient like rubber or any of the synthetic plastic materials having rubber-like character, but it is also not rigid like glass, which is brittle and substantially unyielding. The material is required to have some flexibility from which it can recover. Thus, in inserting the flange 58 into the slot 72, the bulbous bottom edge must pass the narrow portion of 72 to reach the enlarged bottom 74 thereof. The portion 73 will be forced to move outwardly a slight amount, and the flexibility of the material must permit of this without permanent strain or set or breakage, after which, the portion 73 must return to its normal position, locking the flange 58 in place. Successful devices have used polyvinyl chloride for the rigid members.

The assembly of the individual parts of the structure 23 to form same and install same upon the refrigerator door may proceed as follows: the soft flexible gasket member 24 is first attached to the gasket retainer 26 by pressing the arrowhead portion 38 of the flange 36 through the opening 54 into the channel 56 thereof. The gasket retainer has already been precut to the desired length and the corners mitred so as to enable a good fit. The thus assembled gasket 24 and retainer 26 is ready to be slipped onto the peripheral edges of the pan 20 so that the edges of the pan are snugly fitted into the passageway 48 as seen in the upper portion of FIG. 3. The invention also contemplates the installation of the gasket retainer 26 without preassembly and the subsequent assembly of the gasket 24 thereupon in the same manner as above described—however in this instance, the gasket would be continuous around the periphery of the pan, having only a single abutting joint.

The gasket and gasket retainer assembly as installed upon the pan, is designated 80 and is now ready for final application to the shell portion 16 of the refrigerator door. The pan retainer 28 is cut to proper length so as to match that of the assembly 80 and the corners are likewise mitred. A length for each of the four edges of the shell portion is so cut and each is then slipped onto each in-bent portion 18 of said shell portion 16 so that the slot 72 opens toward the flange 58 of the gasket retainer 26 and is aligned therewith. With the four edges of the pan provided with the assembly 80 and the four edges of the reverse-bent portion 18 of the shell portion 16 the flange 58 is simply snapped into the slot 72 and the door is thus assembled. In replacement it is a relatively simple matter to utilize such common tools as a screwdriver and the like to pry the assemblage 80 from the pan retainer 28 or to pry the gasket 24 from the gasket retainer 26.

In order to prevent undue wear on the gasket 24, it is preferable that there be as little relative movement between the gasket retainer 26 and the said gasket 24. This also contemplates that there will be as little strain as possible on the neck of the flange 36, as by tension, twisting and the like. The inner edge 35 is required to have some freedom relative to the remainder of the assemblage to provide the necessary functions of gaskets of this type. In the construction shown, the thickened portion 52 of the gasket retainer member 26 has its upper surface to the left of the opening 56 (outwardly of the closure member to which the device is adapted to be secured), of convex configuration closely conforming to the concave under surface configuration of the gasket wall 32, whereby to intimately and tightly engage the same on the junction 37. This arrangement provides excellent support and stabilization for the gasket member 24 along its entire length and to a great extent relieves the strain placed on the flange 36.

It is desired to point out that the retaining members 26 and 28 may be considered as extruded members of generally rectangular cross section, each having a slot formed therein parallel with the longer sides of the rectangle, entering one of the short edges and extending substantially through the member. The pan retaining member 28 may be considered as having a second slot therein disposed between the inner end of the first slot and the imperforate short side of the rectangle, and opening to the top of the member. The gasket retaining member may be considered as having a flange arranged on its bottom surface adjacent the short side of the rectangle in which the elongate slot enters.

In FIGS. 4 and 5 there are illustrated a second embodiment of the invention wherein both the gasket retainer and the pan retainer are formed as a single extrusion of said rigid plastic vinyl material. This member will be hereinafter referred to as an S-shaped member or retainer 82 and comprises an elongate flat panel 44' of a width selected to be greater than the width of the return-bent portion 18 of said door shell 16. Spaced above and parallel with said panel 44' is a wall 42' having a thickened portion 52' which is substantially equivalent to the thickened portion 52 of the gasket retainer 26. This portion also carries a channel 54' having a constricted opening 56', these being substantially equivalent to the channel and opening 54 and 56 respectively. The wall 42' is connected with the panel 44' by an integral wall 46' provided along the outer edge of the panel 44'.

The inner edge of the panel 44' has a formation integral therewith providing a hollow chamber 45 entrance to which is achieved through a suitable slot or passageway 70' which, as will be explained, is adapted to receive therein the reverse-bent flange 18 of the shell 16 in the same manner as the slot 70 functions in the structure previously described.

The arrangement of the wall 42' spaced from and parallel with the panel 44' gives rise to a slot or passageway 48' the function of which is identical to that of the passageway 48 previously described, namely to receive the edge of the pan 20 therein.

The chamber 45 and the slot 70' are formed by integral walls 68' and 66' and a flange 86 connected to the wall 66' by a suitable bend 84. On the interior of the chamber 45 there is provided a diagonal projection 88 whose normal position is as shown in FIG. 4, in the path of the flange 18 as it would move into the chamber 45. The reason for the chamber interior being of greater thickness than the passageway 45' is to provide room for the distortion of the projection 88 during assembly of the structure. This is shown in FIG. 5.

As in the case of the structure of FIGS. 2 and 3, a gasket member 23 is adapted to be mounted on the retainer member 82, and in the same manner. In the figures the gasket member is shown to be substantially identical to that of FIGS. 2 and 3. Again, the thickened portion 52' of the retainer member 82 has its outer convex surface of conforming configuration relative to the concave underside of the gasket member 23 in order to provide a firm and stable engagement therewith.

In assembling the gasket member 23 and the retainer member 82, with the pan 20 removed, the gasket and retainer assemblage is slipped onto the flange 18. This is done on all sides of the refrigerator door. The ends of the assemblage may be mitred and expected to form neat joints without difficulty, because after mounting on the door, each of the assemblages is forced substantially outward of the door edges as shown in FIG. 5. This is accomplished by pushing the free end of the flange 18 into the passageway 45' and against the resistance of the stop member 88. This distorts and pushes the stop member aside, into the bottom of the chamber 45. Thereafter the pan is laid upon the door. In order to do this, it is necessary to raise the free edges 35 of the gasket members 23 which extend around the outer edges of the door.

Thereafter each of the gasket-retainer assemblages is pushed inwardly of the door by an amount which is determined by the dimensions of the structure. Conveniently the proper location would clear the stop members 88 so that any tendency of the gasket-retainer assemblages to slip off the door or once more move outwardly would be resisted by the stop members. This is especially true for the assemblage at the bottom of the refrigerator door, since this assemblage would bear the greater weight of the pan 20 and whatever additional weight might be added by other commodities carried thereby.

Since the normal refrigerator door that has shelves and cubicles provided on the inner pan thereof also has these set inwardly of the shell, the greater portion of the weight of such structures may be supported by virtue of the box-like configuration of the cooperating members. The pan is a shallow concave member set into the flange of the door shell. This would relieve the apparatus described from carrying a great deal of weight. In other cases, whereby there is some likelihood of the pan and its accessories forcing the bottom assemblage from the door, auxiliary fastening means of a more conventional nature may be provided for the bottom edge of the pan. The advantages, conveniences and economies afforded by the invention in such cases would apply to that number of edges of the pan upon which used, if not all four, or would partially apply in such cases that auxiliary fastening or support means are used.

The parts of the assemblage, whether of the relatively rigid or relatively resilient type, are formed by molding, extrusion, or other suitable methods, the exact nature of which are not of any concern to this invention, except insofar as economies may be effected because of the nature of the invention making it possible to use economical formation methods. It can be appreciated that the structures may be varied as to size, proportions, configurations and in many details without departing from the spirit or scope of the invention as described in the appended claims.

What it is desired to secure by Letters Patent of the United States is:

1. A gasket structure for refrigerator doors and the like having separable pan and shell portions, said gasket structure comprising, a first strip member of soft flexible material, a second strip member of relatively rigid material, first cooperative means associated with said first and second members for securing one to the other, and second cooperative means associated with said second member for securing said first strip to said door adjacent the periphery thereof simultaneously securing said pan and shell portions one to the other in overlapped relationship, said second strip member comprising a pair of extruded members of generally rectangular cross-section, each of said members having a slot therein parallel with the longer side of the rectangle, said slots entering the short edges of said members respectively and extending substantially therethrough, and said second cooperative means comprising a second slot disposed in one of said extrued members between the inner end of said first slot and the imperforate short side of the rectangle, and a protruding flange provided on the surface of the other extruded member adjacent the short side of the rectangle of said first member in which said second slot is disposed, said flange and said slot adapted to form a snap-in connection.

2. A structure which is adapted to be utilized to secure a rigid pan to a refrigerator door or the like, the door being provided with an inwardly extending flange along at least one edge thereof, comprising, an assemblage of at least two elongate members, one being of rubber-like flexible material and serving as a gasket, the second being of relatively rigid material and serving to secure the pan to the door, tongue and groove means yieldably securing said two members together, the second member having means frictionally engaging the flange on one side thereof and frictionally engaging the pan on the other simultaneously to secure both said pan and said flange one to the other in overlapped relationship with the pair of members so coupled, said second member being formed of two parts one of which is adapted to be engaged upon said flange from the inside thereof, the other of which is engaged over the outer edge of the pan and has the first member secured thereto, and the two parts having cooperating means for removably engaging the same together.

3. A structure as claimed in claim 1 in which said first cooperative means comprise an elongate flange formed on the flexible strip member and a slot of conforming configuration thereto formed in the first of said pair of rigid members opening toward said elongate flange, said flange being distortable to permit engagement into said slot.

4. A structure as claimed in claim 1 in which said first cooperative means comprise an elongate flange on said flexible strip member having an enlarged portion on the edge and a slot in the first of said rigid members coextensive with said elongate flange, said slot having a constricted opening facing the said enlarged portion of said flange, and said flange being distortable to permit accommodation past said constricted opening into engagement within said slot.

5. A structure as claimed in claim 2 in which the cooperating means comprise a flange on one part and a slot in the other, the slot being yieldable to receive the flange in snap-in engagement.

6. A structure as claimed in claim 2 in which the cooperating means comprise a flange on one part and a slot in the other, said flange having an enlarged portion along the lower edge thereof and said slot having an enlarged portion of generally conforming configuration to that of said flange, said slot being yieldable to receive the flange in snap-in engagement.

7. A gasket assembly adapted for attachment to a refrigerator door or the like wherein said door includes a shell portion having a reverse bent lip at the periphery thereof and a rigid pan portion adapted to be secured to said lip, said gasket assembly comprising, a soft compressible multilayer strip formation of rubber like material, said formation having a depending longitudinal flange integral therewith, an enlarged portion integral with said flange at the edge thereof, a first rigid member having an opening along one edge thereof and having a longitudinal channel formed therein for accommodating said flexible flange, the opening of said first rigid member engageable with said pan, a second rigid member having a second opening at the opposite side relative said first member and adapted to receive said reverse bent lip portion of the shell portion of said door, and means securing said first and second rigid members one to the other during engagement thereof with said door portions.

8. A gasket assembly for refrigerator doors and the like having separable pan and shell portions with the shell portion having an inwardly directed flange along the periphery thereof, said gasket assembly including a soft, flexible gasket member and a gasket holder of rigid material, first coupling means for releasably securing the gasket to said holder, said first coupling means comprising a depending flange having an enlarged end and formed integral with said gasket and a thickened formation formed on said holder, said thickened formation having a channel formed therein along the length thereof opening toward said depending flange, the opening of said channel being restricted and the said enlarged end removably engageable within said channel through said restricted opening thereby coupling said gasket to said holder, said holder having second coupling means for releasably securing the pan and shell portions thereto, said second coupling means comprising a pair of juxtaposed parallel slots formed in said holder, said slots opening to opposite sides of said holder, one of said slots adapted to receive the peripheral portion of the pan in frictional engagement therewithin, the other of said slots adapted to receive the inwardly directed flange of said shell portion in frictional engagement therewithin.

9. The gasket assembly as defined in claim 8 in which said holder is formed of a pair of elongate members, and third coupling means therebetween are provided for securing said pair of members one to the other, one of said members having said thickened formation formed thereon and one of said slots formed therein, the other of said members having the other one of said slots formed therein.

10. The gasket assembly as defined in claim 9 in which said third coupling means comprises a snap-in connection, said third coupling means comprising a depending flange formed in one of said members and a matching slot formed in the other of said members opening to said flange whereby said slot is adapted to receive said flange in snap-in connection.

11. A structure which is adapted to removably secure a rigid pan to a refrigerator door or the like in the absence of screws and like separate fastening means, the door being provided with an inwardly extending flange along at least one edge thereof, said structure comprising an assemblage of at least two elongate members, the first member being formed of rubber-like flexible material and serving as a gasket, the second member being of relatively rigid material, tongue and groove means operable to yieldably couple said members together, the second member having a pair of oppositely opening slots defining a pair of bights adapted to receive the said flange and the said pan respectively in tight frictional engagement, said second member being divided longitudinally into a pair of rigid strips, one of said strips having said gasket coupled thereto and one of said pair of slots formed therein, and the other one of said strips having the other of said pair of slots formed therein, and the pair of strips having means for coupling same one to the other, said means comprising a depending tongue on one of said strips and an upwardly opening slot of like configuration as said tongue formed in the other one of said strips, said latter slot and tongue being removably engageable in snap-in connection.

12. A gasket assembly for refrigerator doors and the like having separable pan and shell portions with the shell portion having an inwardly directed flange along the periphery thereof, said gasket assembly including a soft, flexible gasket member and a gasket holder of rigid material, first coupling means for releasably securing the gasket to said holder, said first coupling means comprising a depending flange having an enlarged end and formed integral with said gasket and a formation on said holder having a channel formed along the length thereof opening toward said depending flange, the opening of said channel being restricted and the said enlarged end being removably engageable within said channel through said restricted opening thereby coupling said gasket to said holder, said holder having a second coupling means for releasably securing the pan and shell portions thereto, said second coupling means comprising a pair of parallel slots formed in said holder, said slots opening to opposite sides of said holder, one of said slots adapted to receive the peripheral portion of the pan in frictional engagement therewithin, the other of said slots adapted to receive the inwardly directed flange of said shell portion in frictional engagement therewithin.

13. A structure as claimed in claim 12 in which said gasket holder is of an S-shaped configuration of generally rectangular cross-section and having short arms defining said slots.

14. A structure as claimed in claim 12 in which said gasket holder is of a generally elongate S-configuration of substantially rectangular configuration having a pair of short arms defining said pair of slots, one of said arms having the said formation thereon, and the other of said arms having means to limit the entry of said flange in the slots defined thereby, said latter means comprising a diagonally inwardly directed protruding flange on said other arm, said flange being sufficiently resilient to permit passage of said flange therepast only with the exercise of appreciable force but adapted to spring back to limit ordinary movement of said flange therepast.

References Cited in the file of this patent

UNITED STATES PATENTS

| | | |
|---|---|---|
| 1,753,567 | Geyer | Apr. 8, 1930 |
| 2,190,233 | Geyer | Feb. 13, 1940 |
| 2,629,141 | Palmer | Feb. 24, 1953 |
| 2,665,456 | Morton | Jan. 12, 1954 |
| 2,716,447 | Adams et al. | Aug. 30, 1955 |
| 2,751,638 | Wallenbrock | June 26, 1956 |
| 3,002,783 | Hofmeister | Oct. 3, 1961 |

FOREIGN PATENTS

| | | |
|---|---|---|
| 899,225 | France | July 31, 1944 |